United States Patent [19]

Forrest et al.

[11] 4,317,411
[45] Mar. 2, 1982

[54] ROTARY PEANUT AND BLANCHING APPARATUS

[75] Inventors: James T. Forrest, Sylvester; Robert L. Thornton, Moultrie, both of Ga.

[73] Assignee: Seabrook Blanching Corporation of Georgia, Sylvester, Ga.

[21] Appl. No.: 176,106

[22] Filed: Aug. 7, 1980

Related U.S. Application Data

[63] Continuation of Ser. No. 23,969, Mar. 26, 1979, abandoned.

[51] Int. Cl.³ .............................................. A23N 5/01
[52] U.S. Cl. ...................................... 99/623; 99/574; 99/618; 99/622
[58] Field of Search .................. 99/519, 523, 574, 575, 99/603, 609, 617, 618, 622, 623, 628; 241/162

[56] References Cited

U.S. PATENT DOCUMENTS

| | | | |
|---|---|---|---|
| 1,127,430 | 2/1915 | Graves | 99/622 |
| 1,983,441 | 12/1934 | Dowling | 99/618 |
| 2,405,561 | 8/1946 | Egedal | 99/622 |
| 2,663,340 | 12/1953 | Goodwin | 99/575 |
| 2,679,273 | 5/1954 | Harrison | 99/575 |
| 4,091,534 | 5/1978 | Ayotte | 99/575 |

*Primary Examiner*—Philip R. Coe
*Assistant Examiner*—Timothy F. Simone
*Attorney, Agent, or Firm*—Morse, Altman, Oates & Dacey

[57] ABSTRACT

Shelled nuts, particularly peanuts, are blanched by depositing the nuts in a stream onto the surface of a horizontal, rotating table. Relatively fixed baffles or vanes having abrasive working faces are positioned slightly above the upper surface of the rotating table and extend generally from the periphery of the table to a point offset from the center thereof, whereby nuts deposited near the outer portion of the table will be carried against the abrasive face of each vane and spin inwardly towards the center of the table as they are being blanched. The center of the table is formed with a well opening into which the blanched nuts are dropped and then fed onto a conveyor by an inclined trough for subsequent handling such as roasting, packaging or the like. The vanes may be curved or straight and may be adjustable to control the blanching action as well as the blanching time. In a modification of the invention, the baffles mounted above the rotating table may be so positioned that nuts deposited near the center of the table will travel outwardly over the edge of the table and be blanched in the process. A trough is provided beyond the periphery of the table to collect the blanched nuts and guide them onto a belt for further processing.

8 Claims, 8 Drawing Figures

ROTARY PEANUT AND BLANCHING APPARATUS

This is a continuation of application Ser No. 23,969 filed on Mar. 26, 1979, abandoned.

BACKGROUND OF THE INVENTION

1. Field of the Invention

This invention relates generally to the blanching of nuts, preferably peanuts, and more particularly is directed towards a new and improved method and associated apparatus for blanching peanuts in a quick, efficient manner, utilizing relatively simple, compact equipment.

2. Description of The Prior Art

In many food products in which peanuts are an ingredient, blanched nuts usually are preferred over unblanched nuts. A blanched nut is one in which shelled nuts have their hard dark outer skins removed. These nut skins have a slightly bitter flavor and hence are objectionable from the stand point of taste in a food product. Also, the dark skin tends to discolor certain food products such as peanut butter, for example.

Peanuts may be blanched by a number of known techniques and equipment, such for example by water blanching techniques as disclosed in U.S. Pat. Nos. 2,558,899 and 2,964,080. Dry peanut blanching procedures and equipment may be used as disclosed in U.S. Pat. Nos. 2,702,574 and 3,196,914. If the nuts are to be blanched by dry techniques it has been the practice to first slit the nut skins using cutters of the sort shown in U.S. Pat. No. 3,217,764. The slit skin is more easily removed during the abrasive action taking place in the dry blanching operations.

While dry blanching equipment of the sort shown in the above patents has proven to be very efficient, particularly in handling large quantities of peanuts, the equipment has been quite large and not particularly suitable for short run operations or low production output.

Accordingly, it is an object of the present invention to provide a novel method and associated apparatus for blanching peanuts utilizing simple, low cost blanching equipment requiring a minimum amount of space.

Another object of this invention is to provide a novel method and associated apparatus for efficiently blanching peanuts on a continuous basis using dry blanching techniques.

SUMMARY OF THE INVENTION

This invention features the method of blanching peanuts, comprising the steps of supporting the nuts directly and fully on a substantially horizontal rotating surface of predetermined width and causing the nuts to move with the surface and to travel across the surface by trapping and rolling the nuts between said surface and a cooperating fixed abrasive vane disposed adjacent to and at an angle across the surface along the nut path, thereby removing the skins from the nuts by the combined engagement of said rotating surface and said fixed vane.

This invention also features an apparatus for dry blanching peanuts, comprising a rotary horizontal circular table and one or more fixed vanes mounted slightly above the surface of the table and extending across the path of the nuts deposited on the table surface to guide the nuts in a rolling, spinning action across the table surface. The working face of each vane is abrasive and adapted to remove the dark skin from the nuts as it travels therealong. In the preferred embodiment, the table is formed with a central opening adapted to collect the nuts deposited near the periphery of the table. In another embodiment the nuts are deposited at the center of the table and carried outwardly therefrom for collection beyond the edge of the table.

DETAILED DESCRIPTION OF THE PREFERRED EMBODIMENTS

Figure 1:
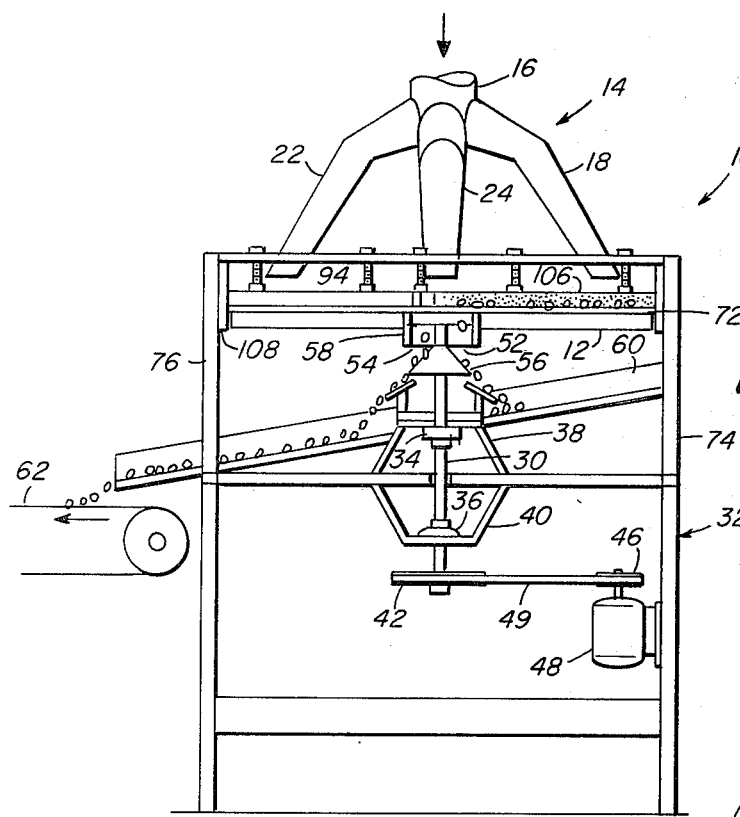
FIG. 1 is a view in side elevation, partly in section, showing a blanching apparatus made according to the invention.

Referring now to the drawings and to FIGS. 1 through 4 in particular, the reference character 10 generally indicates a blanching apparatus organized about a circular, horizontal, rotary table 12 onto the upper surface of which steady streams of peanuts are deposited by means of a spider-like peanut distributor 14 mounted in fixed position above the table 12. The distributor is comprised of a central feed tube 16 having a plurality of adjustable tubular arms 18, 20, 22 and 24 connected to the bottom thereof and extending into positions slightly above the top of the table near the outer edge thereof in order to deposit four individual streams of peanuts onto the table. Obviously, the number of arms may be increased or decreased depending upon the number of deposit locations desired for the table.

The table 12, in the preferred embodiment, is relatively rigid and may be fabricated from a variety of materials such as ¾" plywood, steel plate or a combination thereof, for example. Preferably, the upper surface of the table is covered with a stratum 26 of a rough-textured material adapted to provide good frictional contact with nuts deposited thereon. For this purpose a rubbery material with a grid-like pattern molded in the top surface thereof would provide a good frictional characteristics for the purposes desired. While dimensions are not critical, a practical embodiment of the invention would involve a table three feet in diameter with a central well opening 28 approximately 6" in diameter.

The table is rotatably supported by a vertical drive shaft 30, best shown in FIG. 1, mounted to a frame structure 32 by means of bearings 34 and 36 attached to supports 38 and 40. The lower end of the shaft 30 is provided with a pulley 42 connected by a belt to 44 to a pulley 46 driven by a motor 48. Preferably the motor 48 is a variable speed motor by means of which the rotational speed of the table 12 may be selectively varied. Alternatively, known mechanical means may be provided for changing the speed of the table. The upper end of the shaft 30 connects to the table 12 by means of radial struts 50.

Mounted directly below the struts 50 is a conical collar 52 which guides the nuts dropping down through the well opening 28 outwardly through ports 54 and 56 formed on opposite sides of a tube 58 mounted to the edge of the table opening 28 and depending therefrom in spaced, coaxial relation to the drive shaft 30. Peanuts dropping into this well will be deflected against the conical collar 52 and pass out through the ports 52 and 54 where they will be collected on an inclined trough 60 delivering the nuts onto a belt conveyor 62, for example, for further processing such as roasting, packaging, or the like.

Figure 2:
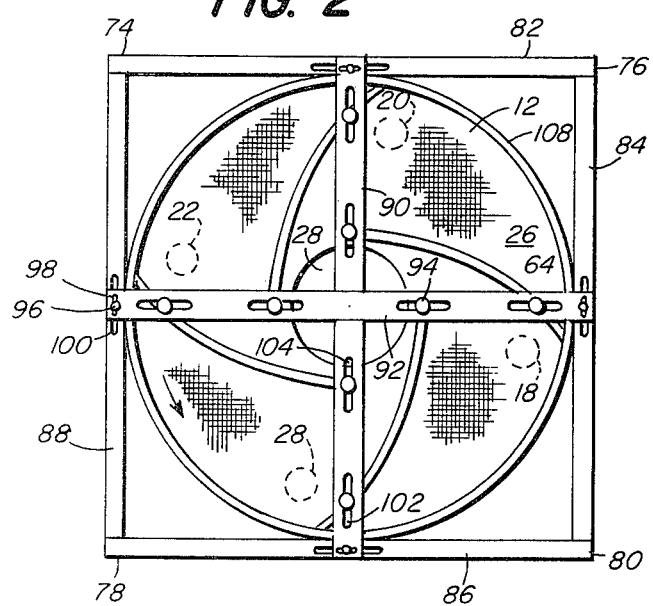
FIG. 2 is a top plan view thereof with the nut feeding unit removed for the sake of clarity.

Mounted in a relatively fixed position slightly above the upper surface of the table 12 is a set of baffles or vanes 64, 66, 68 and 70 arranged in evenly spaced relation with respect to one another and suspended above the surface of the table to define a slight clearance 72 therewith. The support arrangement for the vanes 64-70 comprises a framework mounted to the structure 32 and including upright frame members 74, 76, 78 and 80 rigidly connected to horizontal frame members 82, 84, 86 and 88. Supported by the horizontal frame member are cross-pieces 90 and 92 intersecting one another in the form of a cross, as best shown in FIG. 2, and from which the several vanes 64-70 are suspended by means of screw connectors 94. The ends of the cross-pieces 90 and 92 are adjustably connected on their respective horizontal frame members as by screws or nuts and bolts 96 extending through slots 98 and 100 formed in the cross-piece and the horizontal frame members, respectively. In this fashion the cross-pieces may be moved within a limited range as one adjustment component for varying the position of the vanes.

The vanes themselves are supported by the screw connections 94 which engage the ends of each vane with the upper ends of each screw extending through slots 102, 104 formed in the cross-pieces. These slots provide an additional adjustment component to provide great flexibility in the angular orientation of the vanes with respect to the rotating table and by means of which the blanching action on the nuts may be closely controlled. It will be understood that by varying the angle at which the vane extends across the path of travel of the nuts on the table, the time during which the nuts are in contact with the vanes may be selectively increased or decreased, thereby increasing or decreasing the blanching action on the nuts.

The working face of each vane 64-70 is covered with abrasive stratum 106, which typically is a grit material, and may be in the form of sandpaper or grit applied by a suitable adhesive to the working face of the vane. As the nuts spin across the working face of the vane from the outer end thereof towards the inner end, the abrasive character of the working face will wear off the dark outer skin of the nuts and then guide it into the well opening 28 in the center of the table.

Figure 3:
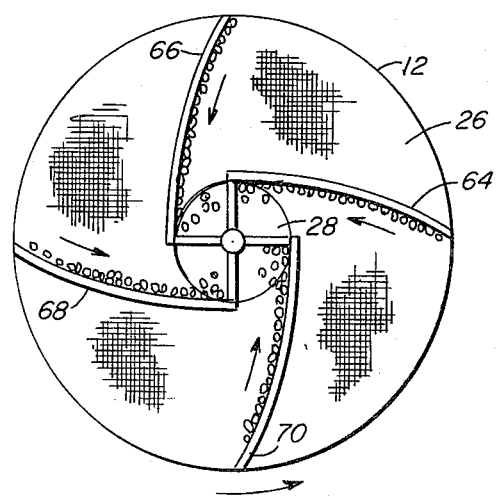
FIG. 3 is a top plan view of the table and vanes shown in FIG. 2.

In the preferred form of the invention the vanes 64-70 are slightly curved and are arranged in a pattern resembling an Archimedes spiral, as best shown in FIG. 3. The abrasive concave working face is directed against the path of travel of the nuts carried by the rotating table 12. The nuts are deposited near the outer edge of the table as indicated by dotted circles representing the locations of the ends of the feed tubes 18-24. The inner ends of the vanes terminate in close proximity to or slightly over the edge of the well opening 28 so that the nuts, having moved inwardly while spinning against the abrasive face of the vane, will then drop into the well by the guiding action of the vane.

In addition to being angularly adjustable, the several vanes may also be raised or lowered slightly by means of the screws connectors in order to correct for such things as a minor wobbling motion of the table, or the like. To ensure that all of the nuts deposited on the table are kept on the table, an annular wall 108 is mounted to the same frame that carries the vanes. Typically, the annular wall 108 extends down into closely spaced relation to the peripheral edge of the table and extends upwardly above the table by a distance of perhaps 6" or so. Further control over the movement of the nuts can be provided by installing a flat pan (not shown) over the top of the vanes so that bouncing of the nuts will be reduced. Also, the loose nut skins that have been removed from the nuts during the blanching operation can be carried away from the blanching machine by suitable means such as a vacuum system having pick-up slots or nozzles suitably located as at the backside of each vane. While the blanching apparatus of the illustrated embodiment is shown with four vanes, obviously this number may be increased or decreased as desired with four being shown for the sake of convenience and clarity.

Figure 5:
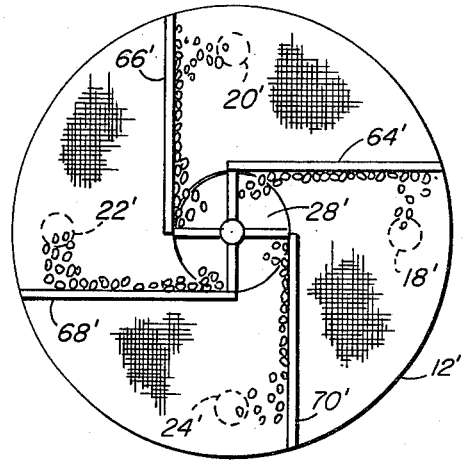
FIG. 5 is a top plan view similar to FIG. 3 showing a modification of the invention.

Referring now to FIG. 5, there is illustrated a modification of the invention and, in this embodiment, instead of curved vanes being used, straight vanes 64', 66', 68', and 70' are employed. The vanes are arranged in a pattern similar to that of the principal embodiment with the exception they are substantially perpendicular to one another, each vane arranged generally tangential to the center well opening 28' and defining a chord with respect to the upper surface of the table 12'. The angle at which the vanes are positioned is such that nuts deposited near the outer edge of the table will be guided inwardly towards the well 28', as in the principal embodiment. In all other respects the apparatus corresponds with that of the principal embodiment and it will be understood that the working faces of the vanes 64'-70' are covered with an abrasive material in order to provide the desire blanching action.

Figure 6:
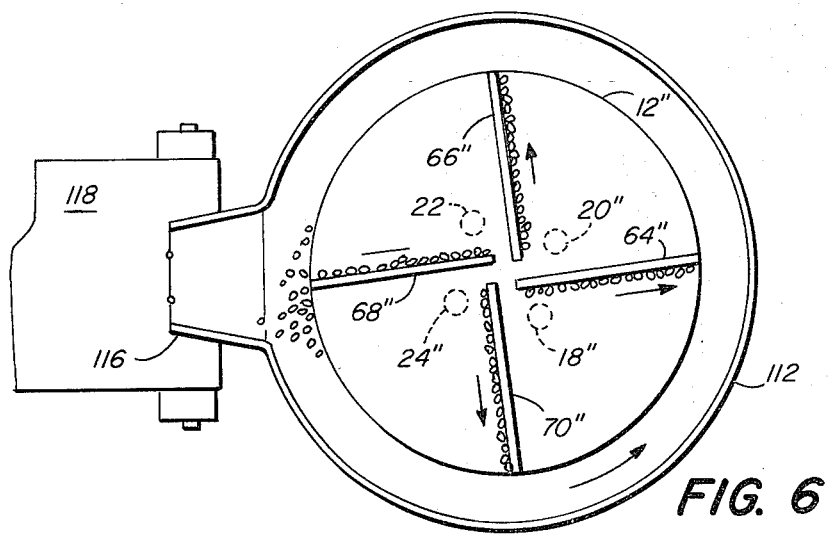
FIG. 6 is a top plan view showing another modification of the invention with the vane support members removed for the sake of clarity.
Figure 7:
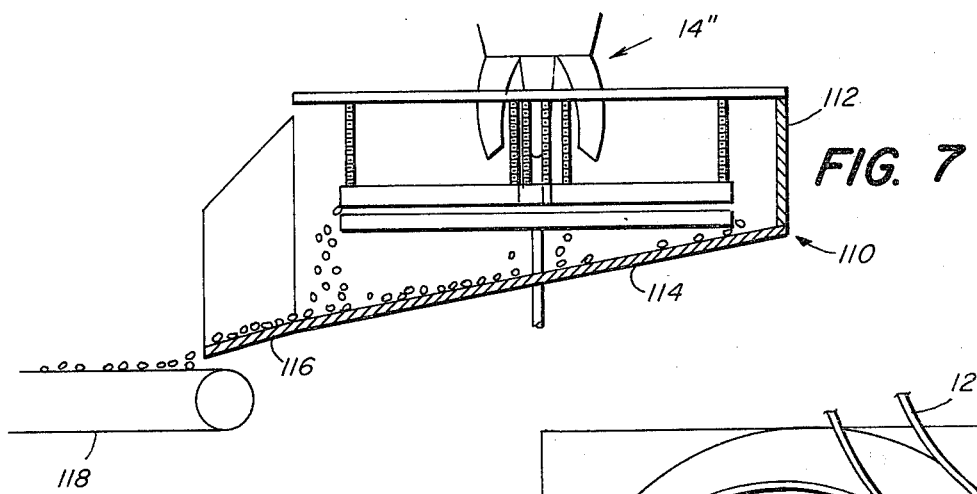
FIG. 7 is a sectional view in side elevation of the FIG. 6 apparatus, and, FIG. 8 is a top plan view showing a modified center feed rotary blancher.
Figure 4:
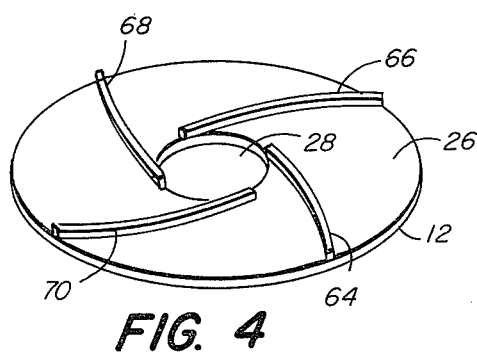
FIG. 4 is a view in perspective of the table and vane components.

Referring now to FIGS. 6 and 7 there is illustrated another modification of the invention and in this embodiment, a table 12" is formed with a continuous supper surface, there being no center well opening as in the previous embodiments. In this embodiment the nuts are deposited near the center of the table and, because of the angular positions of the vanes 64",66", 68" and 70", the nuts are carried from the center of the table outwardly.

In the prior embodiments the outward end of each of the vanes was located ahead of the inner end thereof with respect to the path of travel of the nuts so that the nuts were guided inwardly rather than outwardly. In the embodiment of FIGS. 6 and 7, the outer end of each of the vanes 64"-70" is positioned behind the inner end of each vane with respect to the path of travel of the nuts, so that nuts deposited near the center of the table and before the working face of each vane, will be guided outwardly from the center. The nuts will spin against the abrasive faces of the vanes and will ultimately drop over the outer edge of the table 12", having been fully blanched in the process.

The nuts may be deposited by a feed unit 14", similar to that of FIG. 1 with the exception that the several tubular arms are moved in close to the center of the table as shown in FIG. 7. The several vanes 64"–70" are suspended slightly above the table 12" by a support system similar to that of the principal embodiment to allow for adjustment of the vanes vertically to control the clearance and horizontally to control the angle of each vane.

Surrounding the rotating table in spaced relation to it is a housing 110 comprised of an upright circular side wall 112 and an inclined bottom wall 114 at the left hand lower end of which is shown in FIGS. 6 and 7 is a discharge chute 116 from which the nuts are delivered onto the belt 118, for example, if the nuts are to be further processed.

Figure 8:
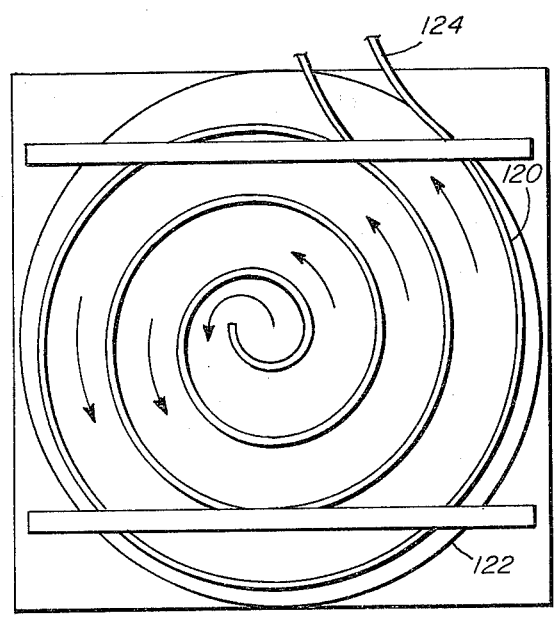

Referring now to FIG. 8 of the drawings there is illustrated a modification of the center feed type rotary blanching and, in this embodiment, a single abrasive spiral vane 120 is mounted in fixed position slightly above a rotary table 122. The spiral vane defines a spiral flow path of several convolutions for a single stream of peanuts deposited on the center of the table as by a feed tube located slightly above the center of the table. The vane defines a discharge chute 124 over the outer edge of the table from which the blanched nuts are discharged. As before, the vane 120 may be mounted for limited vertical adjustment.

While the invention has been described with particular reference to the illustrated embodiments, numerous modification thereto will appear to those skilled in the art. For example, while one drive arrangement is illustrated for rotating the table, obviously a number of other drive systems may be utilized to advantage. For example, a drive motor could be mounted directly above the table and connect to it by an appropriate coupling means. Also, various other measures may be utilized to collect the nuts which are blanched after moving across the top of the table. Further, various means may be employed to mount the vanes in position above the rotating table.

Having thus described the invention, what we claim and desire to obtain by Letters Patent of the United States is:

1. Apparatus for blanching peanuts and the like, comprising
   (a) a horizontally disposed circular table mountable for rotation about a vertical axis and adapted to carry peanuts deposited on the upper surface thereof, said upper surface being generally flat over the entire extent thereof and of a frictional character,
   (b) drive means connected to said table for rotating said table about said axis,
   (c) peanut feeding means operatively associated with said table for delivering at least one stream of peanuts onto the upper surface of said table,
   (d) at least one guide member having an abrasive working face mounted in relatively fixed position and closely spaced relation to the upper surface of said table and extending generally from the periphery of said table continuously to the center portion thereof and at an angle to the radius of said table whereby said peanuts carried by said table will roll against only said fixed working face along a smooth continuous path extending from the periphery of said table to the center portion thereof to be blanched thereby,
   (e) said guide member being in the form of a spiral orginating near the center portion of said table and terminating near the outer edge thereof.

2. Apparatus according to claim 1 wherein said table is formed with a central opening and said guide member is positioned with an outer end angularly ahead of its inner end with respect to said rotating table whereby peanuts deposited near the periphery of said table will roll against said working face inwardly of said table and drop through said opening.

3. Apparatus according to claim 1 wherein said guide member is positioned with its inner end angularly behind its outer end with respect to said rotating table whereby peanuts deposited near the center of said table will roll against said working face outwardly of said table and over the peripheral edge thereof.

4. Apparatus according to claim 1 wherein said face is longitudinally curved from end to end and presenting a concave face to said peanuts carried by said table.

5. Apparatus according to claim 1 wherein said face is straight.

6. Apparatus according to claim 2 including a tube mounted to and depending downwardly from the edge of said opening to guide peanuts falling through said opening, said tube being formed with at least one port therein and deflector means positioned along said tube adjacent said port to direct said peanuts out through said port.

7. Apparatus according to claim 2 including an annular wall disposed about the periphery of said table.

8. Apparatus for blanching peanuts and the like, comprising
   (a) a horizontally disposed circular table mountable for rotation about a vertical axis and adapted to carry peanuts deposited on the upper surface thereof, said upper surface being generally flat over the entire extent thereof and of a frictional character,
   (b) drive means connected to said table for rotating said table about said axis,
   (c) peanut feeding means operatively associated with said table for delivering at least one stream of peanuts onto the upper surface of said table,
   (d) at least one continuous guide member having an abrasive working face mounted in relatively fixed position and closely spaced relation to the upper surface of said table and extending in a smooth continuous reach generally from the periphery of said table to the center portion thereof and at an angle to the radius of said table whereby said peanuts carried by said table will roll only against said fixed working face along a smooth continuous path extending from the periphery of said table to the center portion thereof to be blanched thereby, and,
   (e) adjustment means connected to said member for selectively varying the angle of said member with respect to the axis of said table.

* * * * *